Aug. 8, 1967     W. J. NELLEN     3,335,079
ELECTRODIALYSIS APPARATUS INCLUDING VERTICALLY
SUSPENDED ION EXCHANGE MEMBRANES
Filed Nov. 19, 1962     3 Sheets-Sheet 1
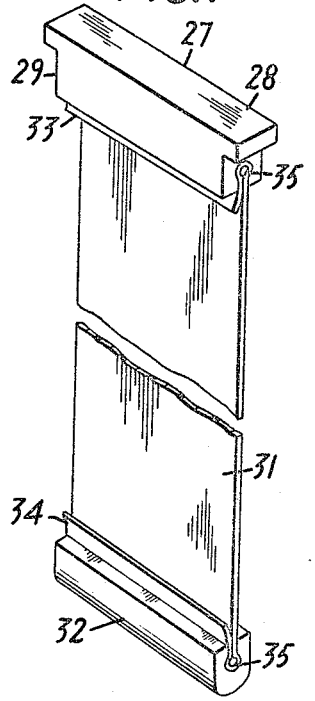
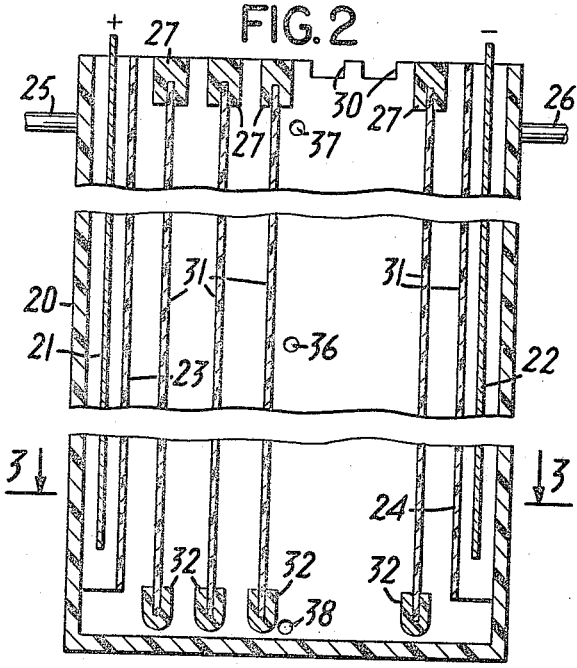
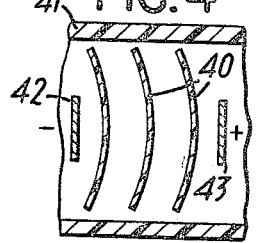
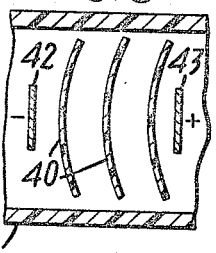
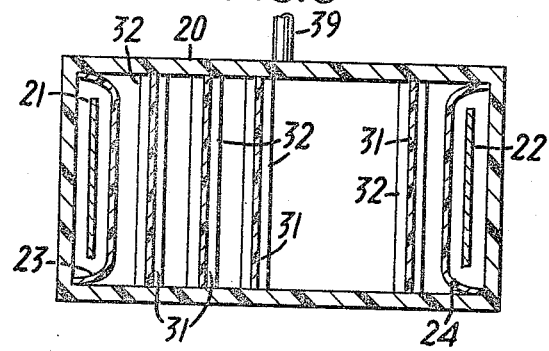
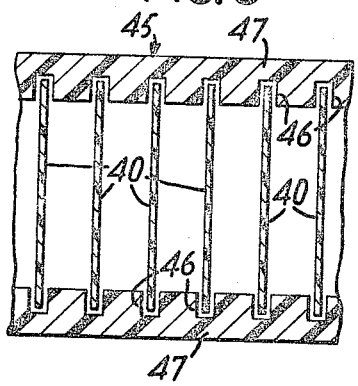
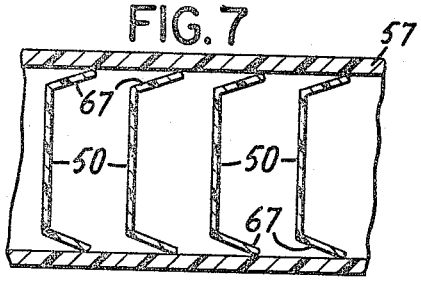
INVENTOR.
WILLIAM J. NELLEN Aug. 8, 1967

W. J. NELLEN 3,335,079

ELECTRODIALYSIS APPARATUS INCLUDING VERTICALLY
SUSPENDED ION EXCHANGE MEMBRANES

Filed Nov. 19, 1962

INVENTOR.
WILLIAM J. NELLEN

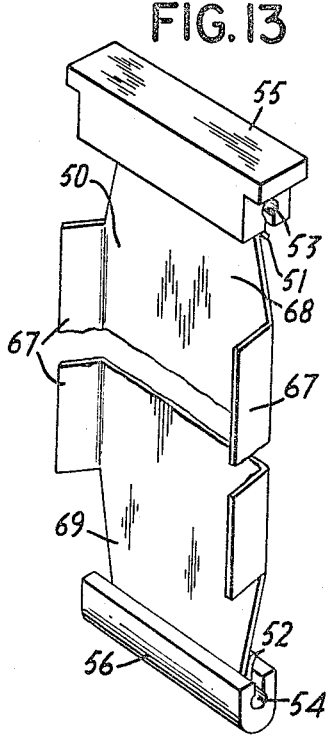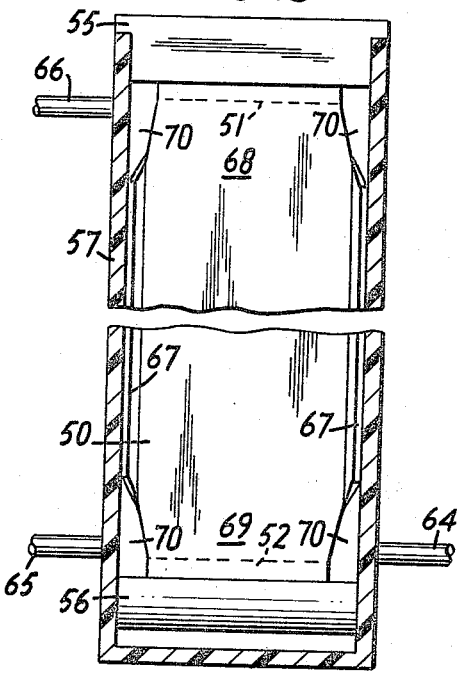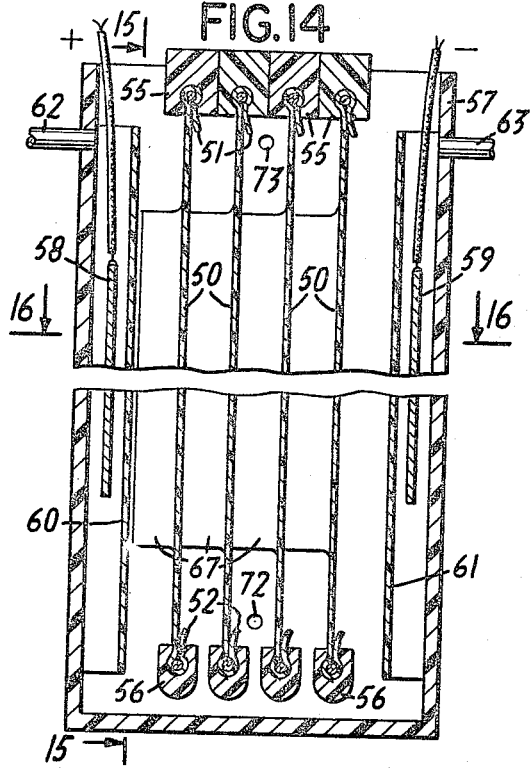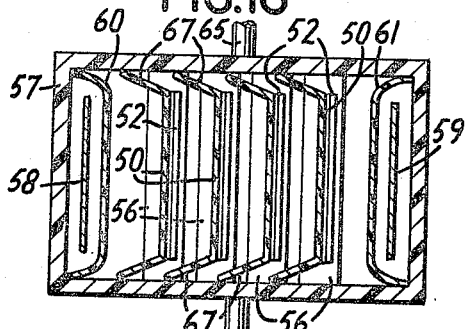

United States Patent Office 3,335,079
Patented Aug. 8, 1967

3,335,079
ELECTRODIALYSIS APPARATUS INCLUDING VERTICALLY SUSPENDED ION EXCHANGE MEMBRANES
William Joseph Nellen, Greenwich, Conn., assignor to American Machine & Foundry Company, a corporation of New Jersey
Filed Nov. 19, 1962, Ser. No. 238,542
10 Claims. (Cl. 204—301)

This invention relates in general to electrodialysis apparatus and, more particularly, to electrodialysis apparatus having tensioned flexible membranes.

If a number of similar ion selective membranes are disposed in a substantially vertical position between two electrodes to define fluid treatment compartments, within each fluid treatment compartment a concentrate solution will form on the side disposed toward one electrode and a relatively dilute solution on the other side disposed towards the other electrode. For example, if a number of cation permeable membranes are disposed between an anode and a cathode to define fluid treatment cells filled with an aqueous salt solution, cations will pass out of each fluid treatment cell through the membrane on the cathode side of the fluid treatment cell. These cations will enter each adjacent fluid treatment cell on its anode side. Thus each cell has a relatively dilute solution on its cathode side and a relatively concentrated solution on its anode side. Since the concentrated solution is more dense than the dilute solution, the concentrated salt solution in each fluid treatment cell will sink downward and may be drawn off as a concentrate stream. In a like manner, the less dense solution will tend to rise and may be drawn off from the upper part of the fluid treatment cells as a dilute or product stream.

It is, therefore, an object of this invention to provide a less expensive, more easily manufactured, and more easily maintained fluid treatment apparatus of the type hereinbefore described.

Another object of this invention is to provide an electrodialysis apparatus having free hanging and weighted membranes which form fluid treatment cells within a suitable tank.

A further object of this invention is to provide a fluid treatment aparatus in which the membranes are vertically self-aligning regardless of the vertical position of the apparatus itself.

Still another object of this invention is to provide a fluid treatment apparatus having free hanging membranes which are less effected by impact, shock or vibration.

Yet another object of this invention is to provide a fluid treatment apparatus containing free-hanging tensioned flexible membranes which can be individually lifted from the apparatus without interfering with the operation of the apparatus and without dismantling it to replace or repair individual defective membranes.

Yet a further object of this invention is to provide a fluid treatment apparatus containing free-hanging membranes in which current bypass about the edges of the membranes is minimized.

Many other objects, advantages and features of invention reside in the construction, arrangement and combination of parts involved in the embodiments of the invention and its practice will be understood from the following description and accompanying drawing wherein:

FIGURE 1 is a perspective view of a membrane with a central portion broken away and with a membrane holder and a membrane weight attached to the membrane which may be used in a fluid treatment apparatus according to a first embodiment of this invention;

FIGURE 2 is a longitudinal vertical section with two central portions broken away of an electrodialysis apparatus according to the first embodiment of this invention;

FIGURE 3 is a horizontal section taken on line 3—3 of FIGURE 2;

FIGURES 4 and 5 are horizontal sections through a fragment of a tank containing two electrodes and interspersed free-hanging cation permeable membranes flexed according to the polarity of the electrodes;

FIGURE 6 is a horizontal section through a fragment of a tank containing free-hanging membranes having an edge seal according to a second embodiment of this invention;

FIGURE 7 is a horizontal vertical section through a fragment of a tank containing free-hanging membranes having an edge seal according to a third embodiment of this invention;

FIGURE 13 is a perspective view of a membrane having a central portion broken away and being supported and weighted according to the third embodiment of this invention;

FIGURE 14 is a longitudinal vertical section with a central portion broken away showing a fluid treatment apparatus having membranes suspended within it according to the third embodiment of this invention;

FIGURE 15 is a transverse vertical section taken on line 15—15 of FIGURE 14;

FIGURE 16 is a horizontal section taken on line 16—16 of FIGURE 14; and

FIGURE 17 is a transverse horizontal section through a modification of the membrane of the third embodiment of this invention.

Figure 8:
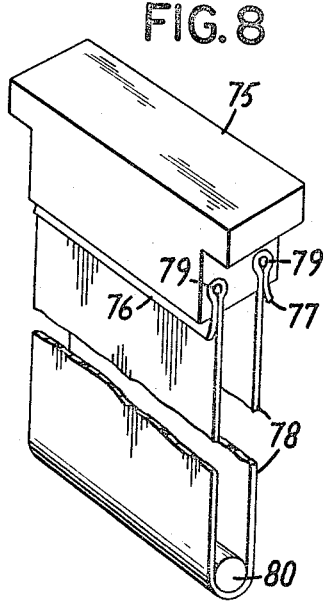
FIGURE 8 is a perspective view of a free-hanging membrane having a central portion broken away and being supported and weighted according to a fourth embodiment of this invention.

Referring to the drawing in detail, FIGURES 1, 2 and 3 show a first embodiment of this invention. A generally rectangular tank 20 has a cathode 21 and an anode 22 suspended in it. Two fluid flow barriers 23 and 24 are placed, respectively, about the electrodes 21 and 22. The barriers 23 and 24 extend above the fluid level within tank 20 and they extend below the electrodes 21 and 22. The barriers 23 and 24 are best formed from a cation permeable membrane material. Two overflow tubes 25 and 26 lead out of tank 20 behind the barriers 23 and 24.

Membrane suspension members 27 have a wider upper portion 28 and a narrower lower portion 29. The lower portions 29 extend across the full inner width of the tank 20. The wider upper portions 28 may rest on top of the edges of tank 20 or they may fit within individual slots 30 which position them along the top of tank 20.

As shown in FIGURE 2, a membrane strip 31 formed of cation permeable membrane material is fixed to each membrane support member 27 to hang beneath it. If, as shown in FIGURE 2, a plain slot is formed in the lower portion 29 of each membrane support member 27, each membrane 31 may be glued or otherwise fixed in it.

Membrane weights 32 are likewise fixed to the lower ends of the membrane strips 31.

FIGURE 1 shows a membrane support member 27 and a membrane weight 32 having keyhole shaped slots formed in them. The ends 33 and 34 of membrane 31 are folded about lengths of O ring rope and member 27 and weight 32 are slid into place over the ends.

As shown in FIGURES 2 and 3, fluid to be treated enters tank 20 through one or more apertures 36. As was hereinbefore described, a dilute solution rises upward and a concentrated solution sinks downward within each fluid treatment cell defined by cation permeable membranes disposed between electrodes. The dilute solution is drawn off through one or more upper apertures 37 and the concentrate solution is drawn off through a lower aperture 38 which communicates with a concentrate stream tube 39. Excess fluid entering tank 20, which does not flow out of tank 20 through apertures 37 or 38, flows under the barriers 23 and 24 and upward about the electrodes 21 and 22 to emerge from tank 20 through tubes 25 and 26 as electrode washing streams.

Referring now to FIGURE 4 in the operation of the fluid treatment apparatus according to the first embodiment of this invention, a hitherto unreported phenomenon was observed. If flexible cation permeable membranes 40 are suspended in a salt solution with a tank 41 between a pair of electrodes 42 and 43, functioning as a cathode and an anode respectively, the membranes tend to curl away from the cathode. This effect is probably caused by relative expansion of the diluting face on the anode side of the membrane compared to the concentrating face on the cathode side of the membrane. This curling effect is more pronounced toward the bottom of the stack where a higher region of concentration builds up with correspondingly higher currents.

As shown in FIGURE 5, when the polarity of the electrodes is reversed, within three minutes the membranes will have completely reversed their curl to curve in the direction of the new cathode. In the first embodiment of this invention, the membranes are free to expand and contract due to different concentrations, ionic species, or temperature while remaining under a desired tension. The membranes need not be suspended tautly. In practice, a weight of 20 grams hung from the bottom of a two inch wide membrane was sufficient to keep the membrane vertical and under a minimum required tension. Waviness in the membranes was not pulled out by this weight, but it was found that the membranes could even touch at various points without fusing or having other gross adverse effects upon the stack operation. Apparently the touching of adjacent membranes only reduced the effective membrane area and did not otherwise interfere with the operation of the apparatus. Furthermore, the open edges of the cells allow the feed aperture 36 to be located at any height and in either or both sides of tank 20. Similarly, product and concentrate outlet apertures 37 and 38 are also flexible in their location in the tank 20.

While fluid treatment apparatus of the type herein described operated best with the membranes defining the fluid treatment cells in a substantially vertical position, such apparatus has been found to function with the membranes inclined up to 60° from the vertical. The free-hanging membranes 31 render the apparatus of this invention less sensitive to accurate vertical alignment. In addition, the free-hanging membranes are less affected by impact, shock or vibration since the cells are not rigidly mounted or enclosed.

Referring now to FIGURE 6, a tank 45 may have vertical slots 46 formed in its side walls 47. The membranes 40 are inserted into membrane holders and weights such as those shown in FIGURE 2; however, the membranes 40 should be wider than the membrane weights to extend into the vertical slots 46. In one test apparatus using membranes 40 about two inches wide and 4 thousandths of an inch thick, the vertical slots 46 were 1/16 of an inch wide, 1/4 inch deep, and spaced 1/4 of an inch apart. The slots 46 serve two purposes. They allow the membranes 40 to flex without moving out of position and without touching. In addition, the slots 46 greatly reduce current bypass around the edges of the membranes.

Referring now to FIGURE 7 and FIGURES 13 through 16, the third embodiment of this invention has membranes 50 with their upper and lower ends 51 and 52 secured in the keyhole shaped slots 53 and 54 of a membrane support member 55 and a membrane weight 56 in the manner described for the first embodiment of the invention. These membranes 50 are suspended in a tank 57 between two electrodes 58 and 59 which are disposed behind the fluid flow barriers 60 and 61. Electrode washing outlet tubes 62 and 63 lead from tank 57 behind the barriers 60 and 61. An inlet tube 64 conducts fluid to be treated into tank 57. Disposed opposite inlet tube 64 is the concentrate stream waste tube 65 and the product or dilute stream tube 66.

The central parts of the membranes 50 have extending from them the side sealing portions 67. The side sealing portions 67 may be formed directly from the material of a membrane 50 by suitable heat forming techniques, or, as shown, in FIGURE 17, side portions 101 may be attached to a central membrane 100. The side sealing edges 67 spring outward to maintain contact with the walls of tank 57 as shown in FIGURE 7 and they may also contact each other in an overlapping relation as shown in FIGURE 16. Directly above and below the side sealing portions 67 the ends of the membrane 50 are formed into two inwardly tapering portions 68 and 69. The tapering portions 68 and 69 leave the triangular clearances 70 through which fluid may flow to manifold the fluid treatment compartments defined by membrane 50. Thus fluid may enter this embodiment of the fluid treatment apparatus through an inlet tube 64 so that a concentrate stream flows out aperture 72 through the concentrate stream waste tube 65 while a dilute or product stream goes out aperture 73 through the product stream tube 66. It is to be noted that the electrodes 58 and 59 are disposed behind the side sealing edges 67 to minimize current bypass through the cut out portions of membrane 50 forming the clearances 70.

Figure 9:
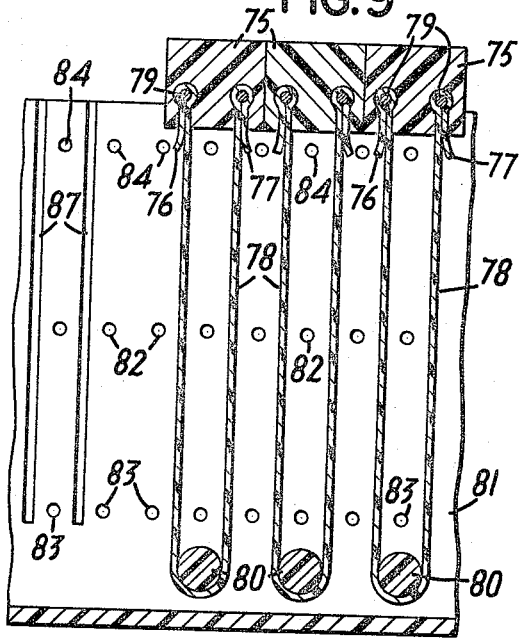
FIGURE 9 is a longitudinal vertical section through a fragment of a tank containing membranes according to the fourth embodiment of this invention.

FIGURES 8 and 9 show a fourth embodiment of this invention. A membrane support member 75 has the two ends 76 and 77 of a membrane 78 folded about two lengths of O ring rope 79 so that the ends 76 and 77 may be secured in suitable slots formed in membrane support member 75. A cylindrical weight 80 is hung in each loop of membrane thus formed.

As shown in FIGURE 9, a tank 81 may have a number of loops of membrane 78 suspended in it from the membrane holders 75. A row of inlet apertures 82 is formed in tank 81 to direct fluid to be treated between adjacent portions of the membrane 78 which form fluid treatment cells. Similar rows of outlet apertures 83 and 84 withdraw dilute and concentrate streams from these fluid treatment compartments.

Figure 10:
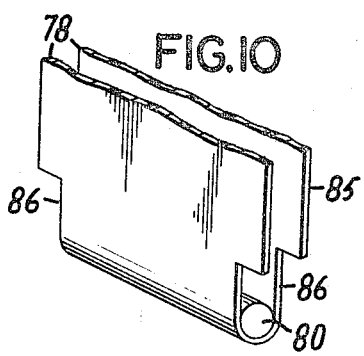
FIGURE 10 is a perspective view of the lower portion of a membrane according to the fourth embodiment of this invention and modified to provide an edge sealed according to the second embodiment of this invention.

As shown in FIGURE 10, a loop of membrane 85 may be suspended from a membrane support member 75 in the manner which has been described. The bottom portion of the loop of membrane 85 is trimmed inward at the cut out portions 86 to extend between the walls of a tank 81. A weight 80 in the bottom of the loop of membrane 85 also extends between the walls of the tank 81. Referring again to FIGURE 9, vertical slots 87 may be cut in the walls of the tank 81 to accommodate the edges of the loop 85 above the cut out portions 86 to provide an edge seal similar to that shown in the second embodiment of this invention.

Figure 11:
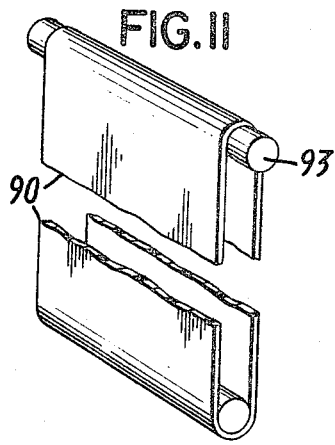
FIGURE 11 is a perspective view of a membrane, having a central portion broken away and being supported and weighted according to a fifth embodiment of this invention.
Figure 12:
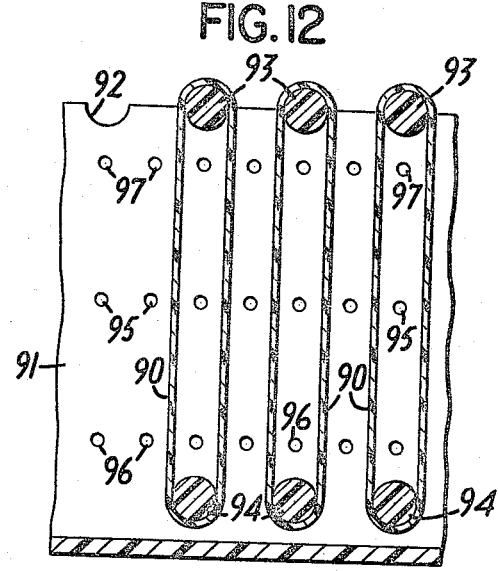
FIGURE 12 is a longitudinal vertical section through a fragment of a tank containing membranes supported according to the fifth embodiment of this invention.

Referring now to FIGURES 11 and 12, a fifth embodiment of this invention has membranes 90 formed from endless strips of membrane material which may be extruded in tubular form and cut to length. The membranes 90 may also be fabricated by gluing or otherwise fixing together the ends of strips. A tank 91 has notches 92 cut along its upper edges. Cylindrical membrane support members 93, wider than the inside of tank 91, rest in the notches 92 and support the upper portions of the endless membranes 90. Cylindrical membrane weights 94 extend between the walls of tank 91 within a lower portion of each endless membrane 90. Inlet apertures 95, concentrate stream outlet apertures 96, and dilute stream outlet apertures 97 manifold the fluid treatment compartments formed between the vertical runs of the endless membrane 90. Tank 91 contains a pair of electrodes (not shown) similar to those shown in the other embodiments of this invention.

What is claimed is:

1. A fluid treatment apparatus comprising, in combination, a tank containing at least one diluting stream outlet opening in its upper portion and at least one concentrating stream outlet opening in its lower portion, membrane holding means disposed across the top of said tank, strips of ion permeable membrane hanging from said membrane support members substantially across said tank, weights at the bottom of said strips of membrane, said strips of membrane being flexibly tensioned substantially vertically by said weights and substantially vibration free and being free to swing a limited distance and electrodes disposed in said tank beyond said strips of membrane.

2. A fluid treatment apparatus comprising in combination, a tank containing at least one diluting stream outlet aperture in its upper portion, at least one concentrating stream outlet aperture in its lower portion, and an inlet aperture, membrane holding members disposed across the top of said tank, strips of cation permeable membrane hanging from said membrane support members substantially across said tank, weights at the bottom of said strips of membrane, said strips of membrane being flexibly tensioned substantially vertically by said weights and substantially vibration free and being free to swing a limited distance, electrodes disposed in said tank beyond said strips of membrane, and fluid flow barriers extending downward in said tank about said electrodes, said fluid flow barriers being formed of cation permeable membrane material, said tank containing electrode washing stream outlet apertures disposed in the upper portions of said tank behind said fluid flow barriers.

3. A fluid treatment apparatus comprising, in combination, a tank containing at least one diluting stream outlet aperture in its upper portion and at least one concentrating stream outlet aperture in its lower portion, membrane holding members disposed across the top of said tank, a strip of ion permeable membrane hanging by its upper end from each of said membrane support members substantially across said tank, a weight at the bottom of each of said strips of membrane, said strips of membrane being flexibly tensioned substantially vertically by the weight at the bottom of each strip and substantially vibration free and being free to swing a limited distance, said membrane holding members and said weights containing keyhole shaped slots, lengths of cylindrical material, the ends of said strips of membrane being folded about said lengths of cylindrical material and being inserted in the slots in said membrane holding members and said weights, and electrodes disposed in said tank beyond said strips of membrane.

4. A fluid treatment apparatus comprising, in combination, a tank containing at least one diluting stream aperture in its upper portion and at least one concentrating stream aperture in its lower portion, membrane holding means disposed across the top of said tank, said tank containing grooves extending downward below said membrane holding means, strips of ion permeable membrane hanging from said membrane holding means across said tank and extending into said grooves, weights at the bottom of said strips of membrane, said strips of membrane being flexibly tensioned substantially vertically by said weights and substantially vibration free and being free to swing a limited distance and electrodes disposed in said tank beyond said strips of membrane.

5. A fluid treatment apparatus comprising, in combination, a tank containing at least one diluting stream aperture in its upper portion and at least one concentrating stream aperture in its lower portion, membrane holding means disposed across the top of said tank, strips of ion permeable membrane supported by said membrane holding means substantially across said tank, said strips of membrane having central portions which have side sealing portions extending outward forming a channel shaped section, said side sealing portions contacting the sides of said tank, said strips of membrane having upper and lower portions cut away from the sides of said tank above and below said side sealing portions, weights at the bottom of said strips of membrane, said strips of membrane being flexibly tensioned substantially vertically by said weights and substantially vibration free and being free to swing a limited distance and electrodes disposed in said tank beyond said strips of membrane.

6. The combination according to claim 5 wherein said side sealing portions of said strips of membrane are formed integrally from membrane material.

7. The combination according to claim 5 wherein said side sealing portions of said strips of membrane are formed from separate pieces of material fixed to said membrane.

8. The combination according to claim 5 wherein said side sealing portions of adjacent strips of membrane overlap and contact each other.

9. A fluid treatment apparatus comprising, in combination, a tank, membrane support means disposed across the top of said tank, strips of ion permeable membrane disposed in loops with both ends of each of said strips secured by said membrane support means, said strips of membrane extending substantially across said tank, weights at the bottom of said loops of membrane, said loops of membrane being flexibly tensioned substantially vertically by said weights and substantially vibration free and being free to swing a limited distance and electrodes disposed in said tank beyond said strips of membrane, said tank containing manifold means in its upper portion conducting a diluting stream from said tank and said tank containing manifold means in its lower portion conducting a concentrating stream from said tank.

10. A fluid treatment apparatus comprising, in combination, a tank, said tank containing diluting stream apertures in its upper portion and concentrating stream apertures in its lower portion, said tank having upper edges containing notches, membrane support members disposed across the top of said tank resting in said notches, endless bands of ion permeable membrane disposed about said membrane support members, weights at the bottom of said endless strips of membrane extending substantially across said tank, the endless strips of membrane being flexibly tensioned substantially vertically by said weights and substantially vibration free and being free to swing a limited distance and electrodes disposed in said tank beyond said endless strips of membranes.

References Cited

UNITED STATES PATENTS

| | | | |
|---|---|---|---|
| 2,854,393 | 9/1958 | Kollsman | 204—301 |
| 2,878,178 | 3/1959 | Bier | 204—180 |
| 2,921,005 | 1/1960 | Bodamer | 204—180 |
| 3,025,227 | 3/1962 | Kollsman | 204—301 |

FOREIGN PATENTS

| | | |
|---|---|---|
| 505,752 | 5/1939 | Great Britain. |
| 532,148 | 1/1941 | Great Britain. |

JOHN H. MACK, *Primary Examiner.*

HOWARD S. WILLIAMS, *Examiner.*

R. K. MIHALEK, *Assistant Examiner.*